(12) United States Patent
Vahle et al.

(10) Patent No.: US 10,137,785 B2
(45) Date of Patent: Nov. 27, 2018

(54) CURRENT COLLECTOR SYSTEM HAVING TELESCOPIC ARM FOR CRANES, CONTAINER CRANES, ERTGS, AND CONVEYING DEVICES

(71) Applicant: Paul Vahle GmbH & Co. KG, Kamen (DE)

(72) Inventors: Werner Vahle, Plombieres (BE); Michael Raabe, Werne (DE); Thomas Muller, Kamen (DE)

(73) Assignee: Paul Vahle GmbH & Co. KG, Kamen (DE)

( * ) Notice: Subject to any disclaimer, the term of this patent is extended or adjusted under 35 U.S.C. 154(b) by 92 days.

(21) Appl. No.: 14/896,454

(22) PCT Filed: Feb. 5, 2015

(86) PCT No.: PCT/EP2015/052421
§ 371 (c)(1),
(2) Date: Dec. 7, 2015

(87) PCT Pub. No.: WO2015/139879
PCT Pub. Date: Sep. 24, 2015

(65) Prior Publication Data
US 2017/0001524 A1    Jan. 5, 2017

(30) Foreign Application Priority Data
Mar. 19, 2014   (DE) .................. 10 2014 103 741

(51) Int. Cl.
*B60L 5/16* (2006.01)
*B60L 5/38* (2006.01)
(Continued)

(52) U.S. Cl.
CPC ............... *B60L 5/16* (2013.01); *B60L 5/38* (2013.01); *B66C 13/12* (2013.01); *B66C 19/002* (2013.01); *F16G 13/20* (2013.01)

(58) Field of Classification Search
CPC ... B60L 5/08; B60L 5/38; B66C 19/00; B66C 19/002; B66C 19/007
See application file for complete search history.

(56) References Cited

U.S. PATENT DOCUMENTS

| 4,922,173 A | 5/1990 | Lawler |
| 5,324,163 A | 6/1994 | Costa |

(Continued)

FOREIGN PATENT DOCUMENTS

| AT | 505757 B1 | 4/2009 |
| CH | 681909 A5 | 6/1993 |

(Continued)

OTHER PUBLICATIONS

International Preliminary Report on Patentability (with English translation) and Written Opinion dated Sep. 20, 2016.

(Continued)

*Primary Examiner* — Jason C Smith
(74) *Attorney, Agent, or Firm* — Panitch Schwarze Belisario & Nadel LLP

(57) ABSTRACT

The invention relates to a current collector system (1) for a vehicle (F) which can be moved in a longitudinal direction along a power rail arrangement (S) having at least one current collector trolley (3) and current collector contacts (5) arranged on this, which current collector contacts can be connected to the power rails (ST) of the power rail arrangement (S) and a telescopic arm (2) which can be fixed or is fixed to a vehicle (F), which telescopic arm can be extended and/or retracted by means of an adjustment drive, characterised in that the adjustment drive has at least one rigid (Continued)

Figure 1:
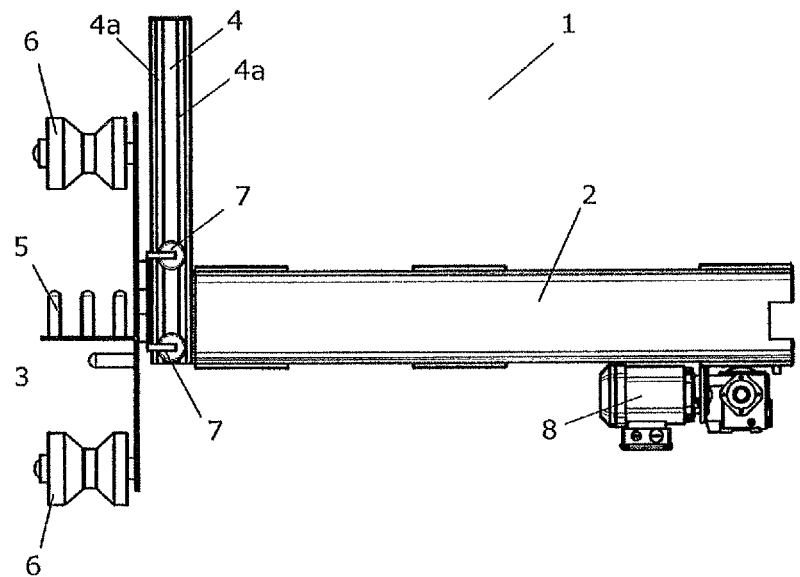

chain arrangement (9) which is driven by at least a first rigid chain drive (8).

26 Claims, 9 Drawing Sheets

(51) Int. Cl.
*B66C 13/12* (2006.01)
*B66C 19/00* (2006.01)
*F16G 13/20* (2006.01)

(56) References Cited

U.S. PATENT DOCUMENTS

| | | | | |
|---|---|---|---|---|
| 5,476,358 | A | * | 12/1995 | Costa ................ B25J 9/023 414/749.1 |
| 5,934,141 | A | | 8/1999 | Costa |
| 6,151,981 | A | | 11/2000 | Costa |
| 7,344,017 | B1 | | 3/2008 | Taguchi |
| 8,844,398 | B2 | | 9/2014 | Richardson |
| 2011/0220447 | A1 | | 9/2011 | Schroder et al. |
| 2016/0123521 | A1 | * | 5/2016 | Raabe ............... F16M 11/2085 191/45 R |
| 2017/0001524 | A1 | * | 1/2017 | Vahle .................... B60L 5/38 |
| 2017/0217333 | A1 | * | 8/2017 | Maier .................... B60M 1/06 |
| 2017/0326988 | A1 | * | 11/2017 | Maier ................... B66C 19/007 |
| 2017/0349049 | A1 | * | 12/2017 | Lang ..................... B60L 5/08 |

FOREIGN PATENT DOCUMENTS

| | | |
|---|---|---|
| CN | 101993005 A | 3/2011 |
| CN | 201864480 U | 6/2011 |
| DE | 3245601 A1 | 6/1984 |
| DE | 3315779 A1 | 11/1984 |
| DE | 9110687 U1 | 10/1991 |
| DE | 19613700 A1 | 10/1997 |
| DE | 29806487 U1 | 7/1998 |
| DE | 102011001712 A1 | 10/2012 |
| EP | 1842823 A1 | 10/2007 |
| EP | 2616379 B1 | 6/2014 |
| WO | 2006130189 A2 | 12/2006 |
| WO | WO-2006130189 A2 * | 12/2006 ............ B25J 9/104 |
| WO | 2010054852 A2 | 5/2010 |
| WO | 2010070915 A1 | 6/2010 |
| WO | 2012130630 A1 | 10/2012 |
| WO | WO-2012130630 A1 * | 10/2012 ............ B60L 5/08 |
| WO | 2012130630 A9 | 5/2013 |
| WO | 2015130879 A1 | 9/2015 |
| WO | 2015154896 A1 | 10/2015 |

OTHER PUBLICATIONS

International Search Report (with English translation) and Written Opinion dated May 15, 2015 in International Application No. PCT/EP2015/055569.
Search Report dated Nov. 25, 2014 in DE Application No. 202014101842.5.
International Search Report (with English translation) and Written Opinion dated May 15, 2015 in International Application No. PCT/EP2015/052421
Search Report dated Nov. 27, 2014 in DE Application No. 102014103741.3.
Czichos, "Die Grundlagen der Ingenieurwissenschaften", Hütte, 8 pages (1996).
Matek, et al., "Maschinenelemente", vol. 16, 4 pages (1987).
Int'l Search Report and Written Opinion dated Oct. 15, 2015 in Int'l Application No. PCT/EP2015/052422.
International Preliminary Report on Patentability dated Sep. 20, 2016 in International Application No. PCT/EP2015/052421.
Int'l Preliminary Report on Patentability (English translation) dated Oct. 12, 2016 in Int'l Application No. PCT/EP2015/052422.
Written Opinion (English Translation) dated May 19, 2015 in Int'l Application No. PCT/EP2015/052422.

* cited by examiner

CURRENT COLLECTOR SYSTEM HAVING TELESCOPIC ARM FOR CRANES, CONTAINER CRANES, ERTGS, AND CONVEYING DEVICES

CROSS-REFERENCE TO RELATED APPLICATIONS

This application is a Section 371 U.S. National Stage Filing of International Application No. PCT/EP2015/052421, filed Feb. 5, 2015, which was published in the German language on Sep. 24, 2015, under International Publication No. WO 2015/130879 A1, which claims priority to German Patent Application No. 10 2014 103 741.3, filed on Mar. 19, 2014, the disclosures of which are incorporated herein by reference.

The present invention relates to a current collector system for a vehicle which can be driven longitudinally along a power rail arrangement having at least one current collector trolley and current collector contacts arranged on it which can be connected to power rails on the power rail arrangement, and a telescopic arm which is fixed to a vehicle or can be fixed to a vehicle, which telescopic arm can be moved in or out by means of an adjustment drive.

A current collector system of this type is known from WO 2010/054852 A2, which current collector system has a telescopic arm, onto the free end of which a current collector trolley is mounted in a vertically displaceable manner. The telescopic arm is positioned in a horizontal direction relative to the power rail arrangement by means of a hydraulic or pneumatic drive until strokes from the current collector trolley hit a deflector plate. The vertical positioning of the current collector trolley relative to the power rails is achieved mechanically by means of an entry ramp, whereby one entry ramp is arranged on each end of the power rail arrangement. The disadvantage of this is that a certain amount of space is required for the vertical positioning.

A system in which the horizontal movement of the telescopic arm and/or the vertical positioning of the current collector trolley relative to the axis of the power rail is achieved by means of a lifting system with a belt drive, the design of which should be elastic and flexible is known from WO 2012/130630 A9. Here too, the threading of the current collectors in the power rails is achieved by means of entry funnels when travelling in a longitudinal direction along the line.

The entry funnel could be designed to be shorter than the entry ramps known from WO 2010/054852 A2.

The object of the present invention is to provide a current collector system with a simple structure.

This object is advantageously achieved by the adjustment drive having at least one rigid chain and at least one rigid chain drive. As a result of the advantageous use of a rigid chain, the individual telescopic stages of the telescopic arm can have a simple structure, unlike in the case of a pneumatic or hydraulic telescopic arm as known from WO 2010/054852 A2. In contrast to the telescopic arm known from WO 2012/130630 A9, the individual telescope stages do not have to drive one another.

The simple structure means it is advantageously possible, in contrast to the telescopic arms known from WO 2010/054852 A2 and WO 2012/130630 A9, to use a greater number of telescopic stages, as a result of which the total length of the current collector system when retracted is shorter as a result of the fact that each telescopic stage can be designed to be shorter.

Provided that the rigid chain drive according to the invention is only used to move the telescopic arm in and out, the vertical adjustment of the current collector trolley can be achieved by the ramps known from WO 2010/054852 A2 or by means of a separate vertical drive.

However, as a result of the use of the rigid chain drive according to the invention and the rigid chain arrangement according to the invention, it is advantageously possible to do without the ramps described above and the additional vertical drive, as the rigid chain used to move the telescopic arm in and out in a horizontal plane can also be used for the vertical adjustment of the current collector trolley.

The rigid chain arrangement has individual rigid chain links which have to be articulately joined to one another, whereby by means of the rigid chain arrangement when the rigid chain links are aligned relative to one another in the direction of thrust, a thrust can be exerted on the collector trolley and/or on the telescopic stage that is most extendible. By means of a deflecting mechanism which can be arranged on the telescopic stage that is most extendible, the rigid chain can be deflected by 90° towards the vertical and then used to lift and/or lower the current collector trolley. Depending on how the power rail arrangement is designed, the current collector trolley must be adjusted to contact the collector with the power rails after the horizontal extension of the telescopic arm either from bottom to top, in other words lifted, or from top to bottom, in other words lowered.

The rigid chain arrangement can be formed from a single rigid chain made up of several rigid chain links. However, it is also possible for the rigid chain arrangement to comprise more than one rigid chain or several segments of rigid chain which are arranged one behind the other and/or in parallel to one another.

To the extent that the same rigid chain is also used for the vertical adjustment of the current collector trolley, the positioning of the current collector trolley relative to the power rail arrangement can be achieved by means of various processes/different designs.

To the extent that the current collector trolley has to be lifted to be threaded into the power rail arrangement after the horizontal extension of the telescopic arm, the rigid chain drive is generally sufficient for the horizontal extension of the telescopic arm and the vertical lifting of the current collector trolley provided that an additional stopping plate which is arranged on the power rail arrangement is used and the weight of the current collector trolley itself is sufficiently great. When the telescopic arm is retracted, in this embodiment the current collector trolley is in the lower position inside the vertical linear guiding arranged on the end of the telescopic arm. When the rigid chain is driven to extend the telescopic arm using the rigid chain drive, the weight of the current collector trolley itself means that the telescopic arm is initially extended in a horizontal direction, or telescoped. When doing this, the current collector trolley remains in the lower position of the vertical guiding due to its own weight. When the current collector trolley reaches the stopping plate which determines the end position of the power rail arrangement, the thrust of the rigid chain is deflected by means of the deflecting mechanism and lifts the current collector trolley up to an upper stop which determines the vertical end position. During the vertical lifting, the telescopic arm does not retract due to the forces acting on it.

If the current collector trolley's own weight is not sufficient so that it leaves its lowest position during the horizontal extension of the telescopic arm and is therefore lifted in a vertical direction before the current collector trolley has come into contact with the stopping plate, it is necessary to use a holding mechanism to keep the current collector trolley in its lowest position until the current collector trolley has reached the stopping plate. Alternatively, the deflecting mechanism can be braked or blocked. It is also alternatively possible to prevent the relative movement between the rigid chain and the telescopic stage which is most extendible by a controllable locking mechanism arranged on the telescopic stage engaging in the rigid chain. The locking mechanism can also be designed to be mechanical, for example in the form of a latch which releases when the current collector trolley comes into contact with the stopping plate from the rigid chain, thereby releasing the rigid chain and the vertical lifting process.

To the extent that the current collector trolley has to be lowered to be threaded into the power rail arrangement after the horizontal extension of the telescopic arm, without appropriate measures such as the blocking of the deflecting mechanism or the provision of a rigid chain brake or locking mechanism for the rigid chain arrangement, the weight of the current collector trolley itself would initially pull downwards when the rigid chain is driven without the telescopic arm being extended in a horizontal direction. When the telescopic arm is retracted, the current collector trolley in this embodiment is in the upper position inside the vertical linear guiding arranged on the end of the telescopic arm. Before the horizontal extension of the telescopic arm, it is initially necessary to ensure that the rigid chain can move relative to the deflecting mechanism and/or the most extendible telescopic stage, which can also be called the innermost telescopic stage, on which the deflecting mechanism is also arranged and therefore an undesirable, premature lowering of the current collector trolley cannot occur. This can be advantageously achieved by means of a chain brake, for example in the form of a blocking mechanism which blocks the deflecting mechanism and/or a force-locking and/or positive-locking connection or locking between the rigid chain and the innermost telescopic stage. When the horizontal end position is reached, which is defined by the stopping plate or can be determined by means of a sensor, this triggers the blocking of the deflecting mechanism or locking (chain brake) between the innermost element of the telescopic arm and the rigid chain, after which when the rigid chain is further extended by means of the rigid chain drive, said chain is deflected about the deflecting mechanism and the current collector trolley is lowered until it reaches the vertical end position which, for example, is recorded by means of a sensor. Since after the release of the chain brake or the blocking device when lowering the current collector trolley in a downwards direction, the force exerted by the weight of the current collector trolley would cause a rolling back or horizontal retraction of the telescopic arm, appropriate measures must be provided to prevent this. The blocking device can therefore also be designed as a braking device with which the deflecting mechanism can be braked and also blocked. Applying a braking force to the deflecting mechanism generates a thrust which acts on the deflecting mechanism and therefore on the innermost telescopic stage and drives this outwards in a horizontal direction and therefore safely avoids the telescopic arm retracting when the current collector trolley is lowered. When doing this, the braking device can be controlled or regulated by means of the horizontal position and/or acceleration of the current collector trolley, whereby the position and/or acceleration are determined using sensors. Controllable locking devices can also block a movement of the individual telescopic stages relative to one another. It is also possible to use a damping device and/or a pre-tensioned spring to slow the relative movement between the chain and the most extendible telescopic stage such that the chain is fed in so rapidly that the current collector trolley is not lowered.

A mechanism can also be designed and arranged such that with its help the acceleration of the most extendible telescopic stage relative to the adjacent telescopic stage and therefore the speed of the relative movement between these two telescopic stages can be reduced or adjusted, in particular can be set to ZERO.

Naturally it is also possible for the telescopic arm to be extended in a horizontal direction, whereby the current collector trolley is adjusted vertically to the correct height. However, this is only possible when the position of the power rail arrangement relative to the vehicle is determined by means of sensors or an image analysis or is already known. The simultaneous horizontal and vertical adjustment of the current collector trolley is possible for example using a current collector system in which the vertical adjustment of the current collector trolley is also achieved by means of the rigid chain. In this way, the vertical adjustment can be controlled or regulated by means of the additional drive of the deflecting mechanism or a controlled braking mechanism for the deflecting mechanism. Naturally it is also possible to use an additional vertical adjustment drive which is driven by a separate motor or by the rigid chain.

In a further embodiment, the deflecting mechanism, which can in particular be formed by a gear mechanism, is driven, can be driven and/or can be set by means of a deflecting drive. The deflecting drive is controlled by a control unit of the current collector system which also controls the rigid chain drive. In order to extend the telescopic arm, the deflecting drive is controlled such that it exerts such a drive torque or holding torque on the deflecting mechanism that the rigid chain does not move relative to the deflecting mechanism and therefore also relative to the most extendible telescopic stage. The deflecting drive, can then be synchronised with the rigid chain drive for the vertical adjustment, in particular lowering, of the current collector trolley such that the length of the section of the rigid chain between the rigid chain drive and the deflecting mechanism and therefore also the length of the extended telescopic arm does not change.

In the embodiments described above the rigid chain can be directly connected to its free end. However, it is also possible for the rigid chain to be connected to the current collector trolley by means of a drive. To the extent that the current connector trolley is adjusted by means of a separate vertical drive, this can either be driven by its own electric motor or the rigid chain. In this case, the rigid chain is guided around the shaft of the deflecting mechanism, whereby the rigid chain rotates the deflecting mechanism and the rotation of the shaft to drive the vertical drive which lifts and/or lowers the current collector trolley in a vertical direction for example by means of a spindle, belt, chain or scissor lift gear.

Once the vertical end position has been reached, the current collectors thread into the power rail by moving the vehicle in the direction of travel by means of entry funnels, whereby the current collector trolley with its rollers and guide rails or tubes is extended or retracted simultaneously such that the power rail arrangement holds the current connector trolley in position as the vehicle continues to be moved along the line relative to the power rails and guides it. In order that when moving the vehicle in a longitudinal direction along the power rail arrangement, tolerances and movements of the vehicle relative to the power rail arrangement can be evened out, after the threading of the current collectors into the power rail arrangement the rigid chain drive is advantageously released so that only slight and therefore negligible mechanical forces from the telescopic arm are exerted on the current collector trolley for the remainder of the operation. The same also applies to any vertical drive or rigid chain mechanism provided which is used for the vertical adjustment of the current connector trolley. To the extent that the telescopic arm has been prevented from retracting again in an undesirable manner after the horizontal extension by means of other measures such as a braking and/or damping mechanism or other locking or holding mechanism, these are also to be released after threading such that the telescopic arm can change its length for the further operation of the vehicle due to the forces acting externally.

The current collector system can have a base body by means, of which it can be fixed to a vehicle. The rigid chain drive and/or the rigid chain reserve storage can be arranged in or on the base body. In addition to this, the first telescopic stage can preferably be guided in a displaceable manner in the horizontal direction or on the base body.

In the rigid chain reserve storage the part of the rigid chain which is not yet being used to exert thrust is stored, whereby the part of the rigid chain which is in the rigid chain reserve storage can be wound up on a drum or arranged in a meander-shaped manner depending on the available space.

Since the rigid chain can only be deflected to one side but it is necessary due to the chain guide to deflect the rigid chain in two directions, which would be the case for example if the drive axis of the rigid chain drive, hereinafter referred to as the first axis, and the axis of the deflecting device, hereinafter referred to as the second axis, are not oriented in parallel to one another, this problem can be resolved by means of two segments of the rigid chain which are twisted towards one another and connected to one another, whereby the one first rigid chain segment is arranged in the space such that it can be guided about the first axis in the first direction and the second rigid chain segment is arranged in the space such that it can be guided about the second axis in the second direction.

It is generally possible for the rigid chain to be formed from more than one rigid chain segment, whereby two rigid chain segments which are each formed from several chain links can be connected to one another by means of a rigid connecting link, for example in the form of rods or pipes. A rigid chain segment is understood to be a section of the chain with more than one chain link. This can reduce the number of rigid chain links required and therefore advantageously reduce the costs and the weight of the current collector system. The use of appropriate connecting links also advantageously increases the transferable thrust of the rigid chain.

The rigid chain merely has to be able to transfer sufficiently great thrust onto the most extensible telescopic stage and/or the current collector trolley if this is also to be set in a vertical direction by means of the rigid chain. A particular feature of a rigid chain, which is also known as a rigid backed chain, is the fact that the chain can only buckle in one spatial direction due to rigid elements on the back of the chain. Introducing the thrust between the joint level and the rigid link also stiffens the chain when it is under pressure.

If it is only the telescopic arm which is to be driven by means of the rigid chain, a rigid chain split into two can also be used, which is only stiffened and able to be used to transfer thrust by the bringing together of the two strands of the chain. The bringing together of the two strands of the chain is achieved in a similar manner to a zip.

If a single strange rigid chain made up of several chain links which are articulately joined together in a row is used, this rigid chain can either operate unsupported, operate supported by supporting surfaces or be guided by means of rails. Due to the use of telescopic stages which are nested inside one another, the use of an unsupported or supported rigid chain is constructively simple to achieve. In order to do this, the support surfaces required for the supported rigid chain can be formed from horizontally and/or vertically arranged walls, for example in the form of simple sheets of metal. If the vertical adjustment is also achieved by means of the rigid chain, a corresponding supporting surface or contact surface can be arranged along the vertical guide on the most extendible telescopic stage.

In order to increase protection against corrosion, for example in a maritime environment, the rigid chain can be protected by a sheath, for example in the form of a gaiter or several gaiters. It is therefore particularly advantageous if the region of the rigid chain arrangement which is used for the vertical adjustment of the rigid chain arrangement is protected from external influences by means of a suitable sheath. The section of the rigid chain in the relevant rigid chain segment which was deflected by the deflecting mechanism into the vertical direction can be protected by a first sheath, in particular a gaiter. The part of the relevant rigid chain segment which runs horizontally in front of the deflecting mechanism can also be sheathed, for example using a gaiter. In general, however, it is sufficient to encapsulate the telescopic arm such that the sections of the rigid chain which run horizontally in the telescopic arm are protected from external influences by the cover of the telescopic arm and the individual telescopic stages. When using a gaiter, this can also be used to permanently lubricate the sheathed rigid chain section, whereby it is filled with the relevant chain oil or grease to this end. Appropriate seals are to be provided to ensure that the chain oil or grease does not flow uncontrolled out of the gaiter. However, it is naturally also possible for other forms of lubrication, in particular using graphite, to be provided.

The part of the rigid chain arrangement which has not yet been adjusted by the rigid chain drive in the telescopic arm to generate thrust can be called the reserve chain. As with the gaiter described above, the housing of the reserve chain can be filled with lubricant, in particular with chain oil or grease.

It is clear that the rigid chain drive described above can also be formed such that the rigid chain drive does not deflect the rigid chain but rather drives a straight part of the rigid chain.

The use of a rigid chain drive has the following advantages:
1. The telescopic arm can be designed in multiple parts, thereby making it shorter or greater horizontal paths can be achieved;
2. Only one drive and one rigid chain are required for the horizontal and vertical movement of the current collector trolley;
3. Fewer components;
4. The rigid chain achieves high repetition accuracy during positioning;
5. The current collector system is light and compact;
6. Low costs.

Figure 2:
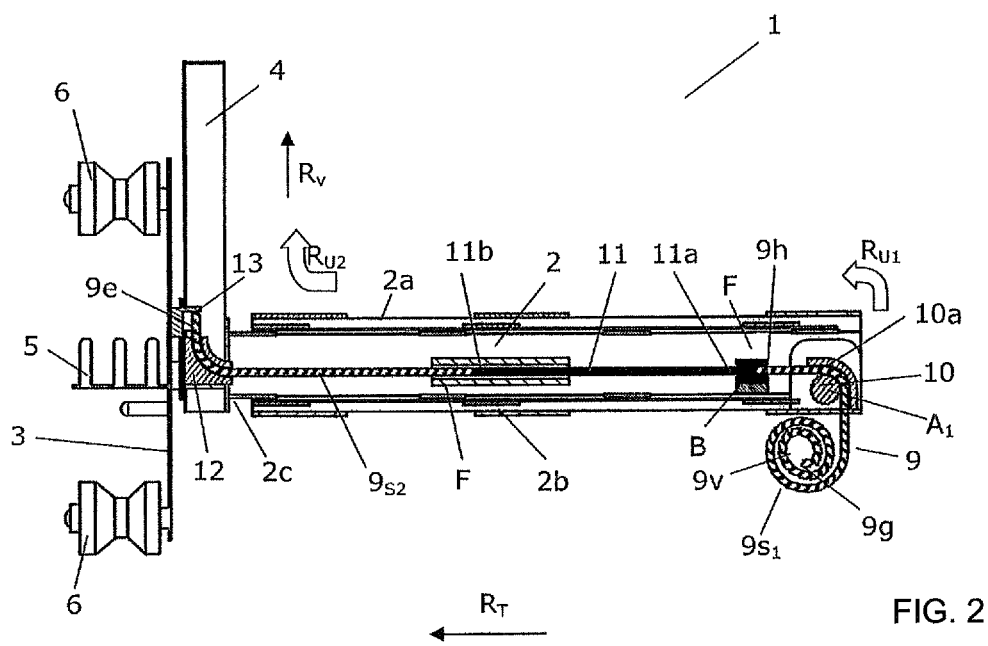
Figure 3:
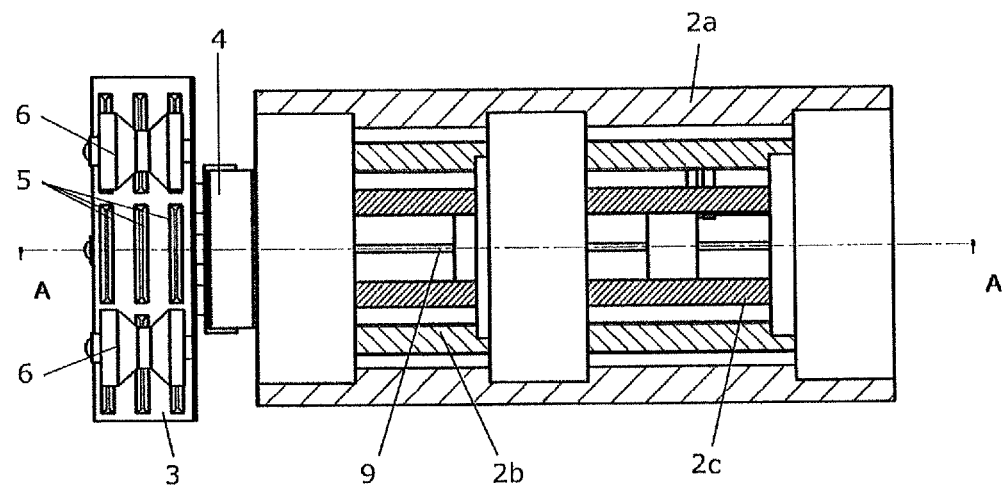
Figure 4:
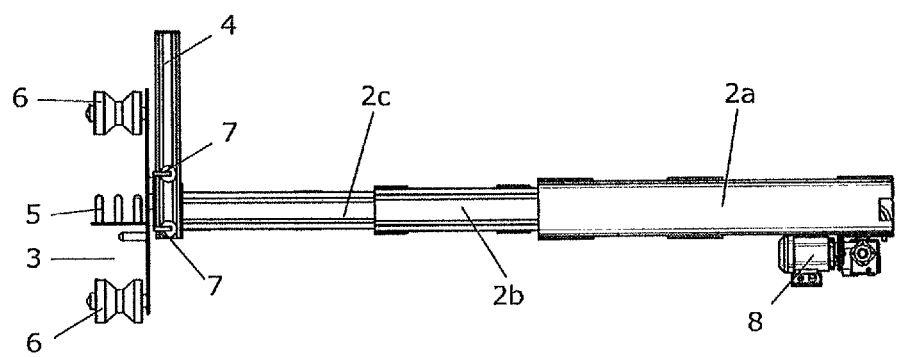
Figure 5:
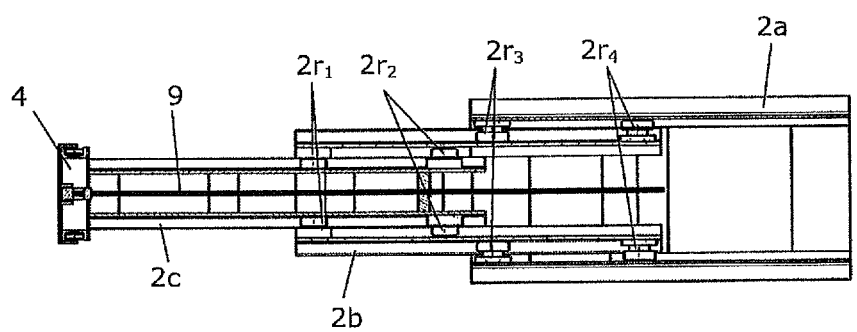
Figure 6A:
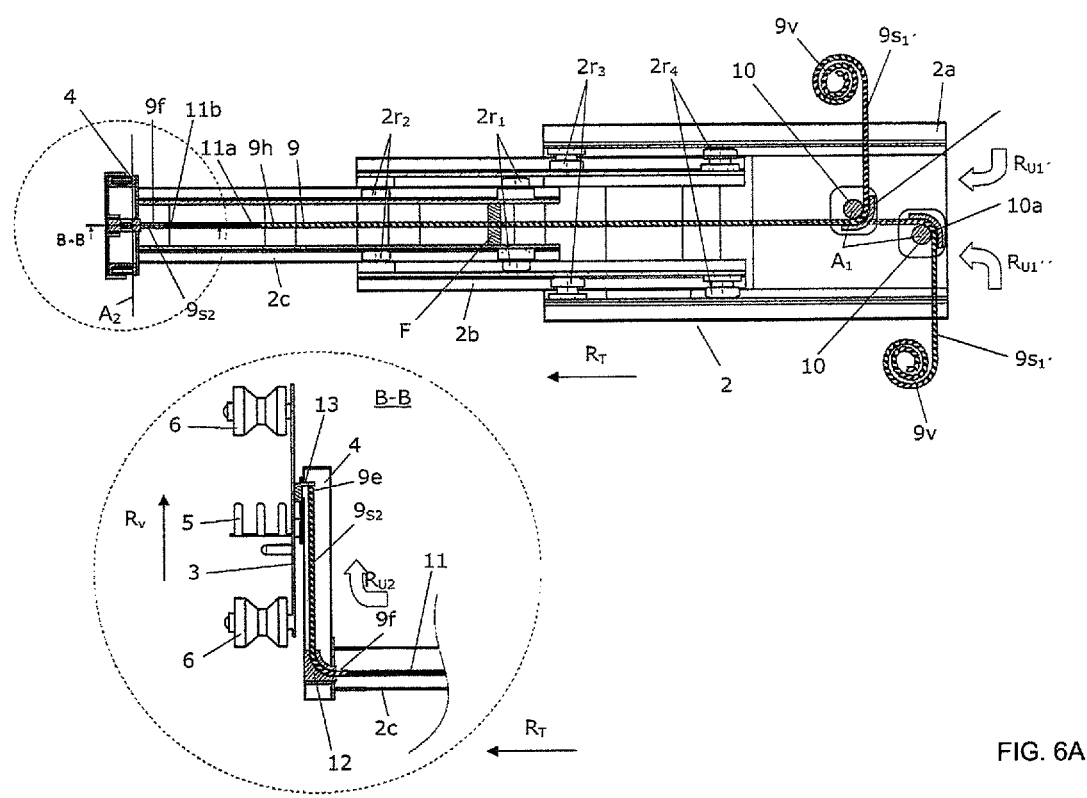
Figure 6B:
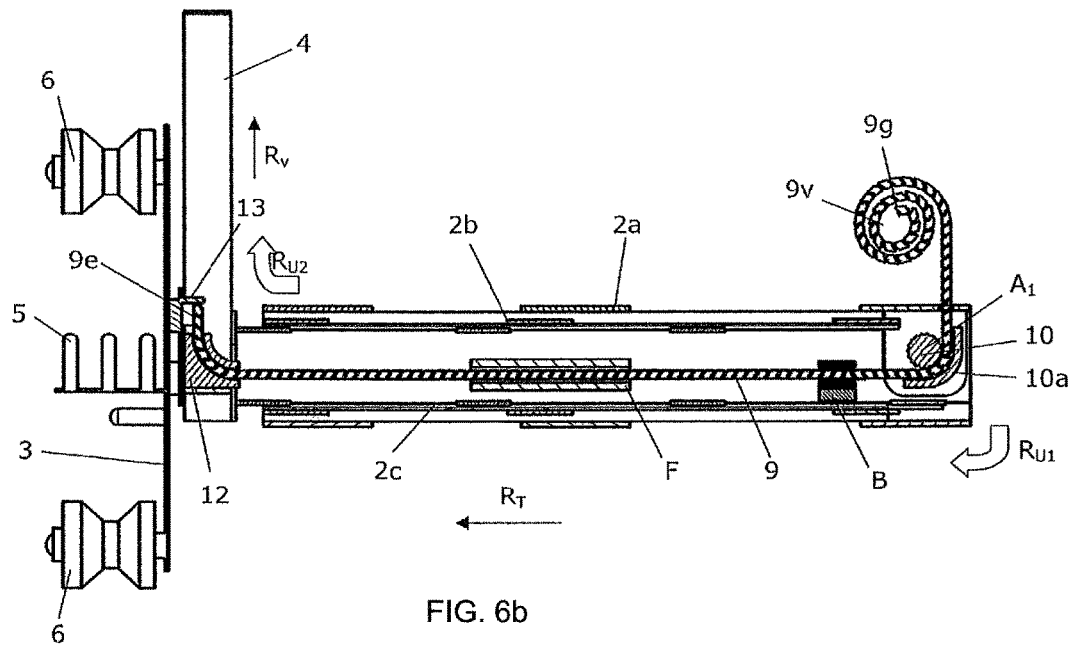
Figure 7A:
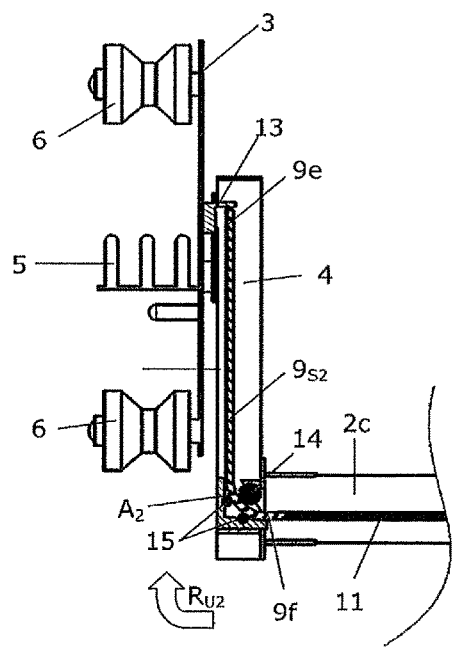
Figure 7B:
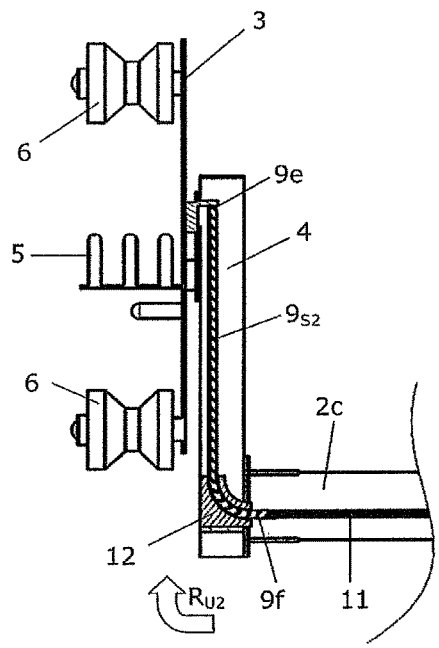
Figure 8A:
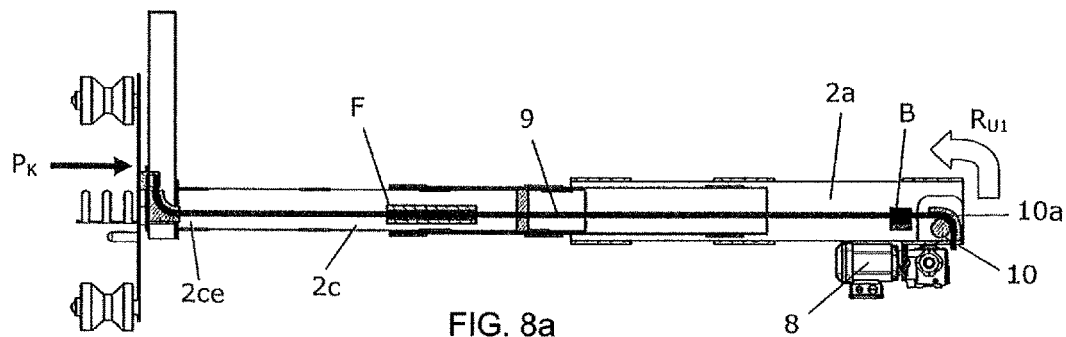
Figure 8B:
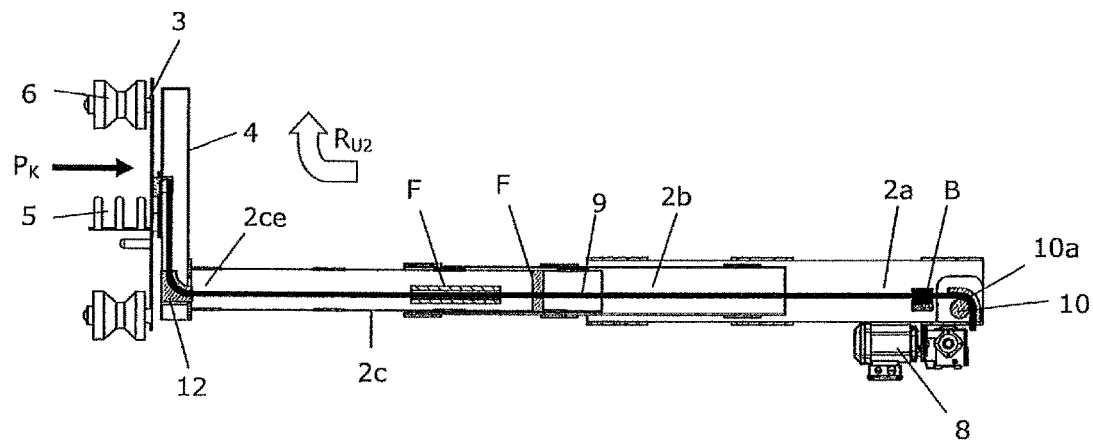
Figure 8C:
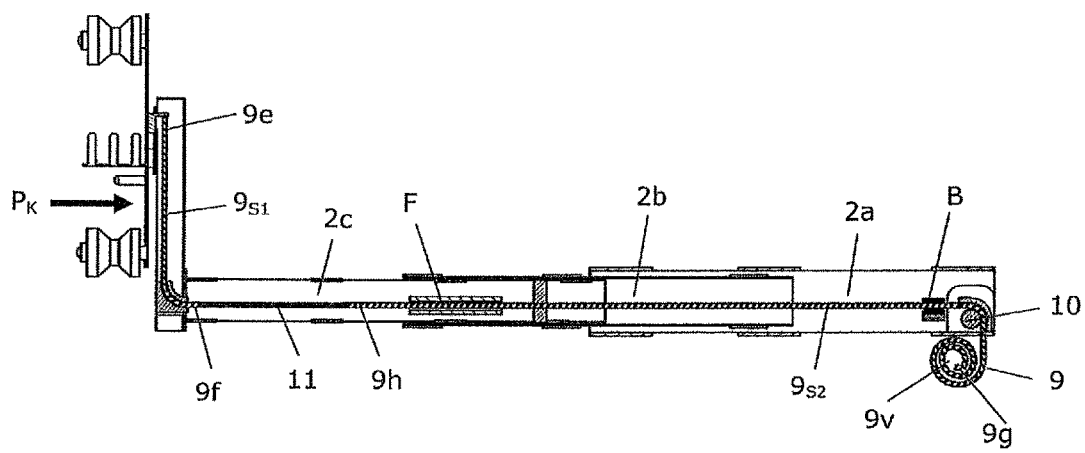
Figure 10A:
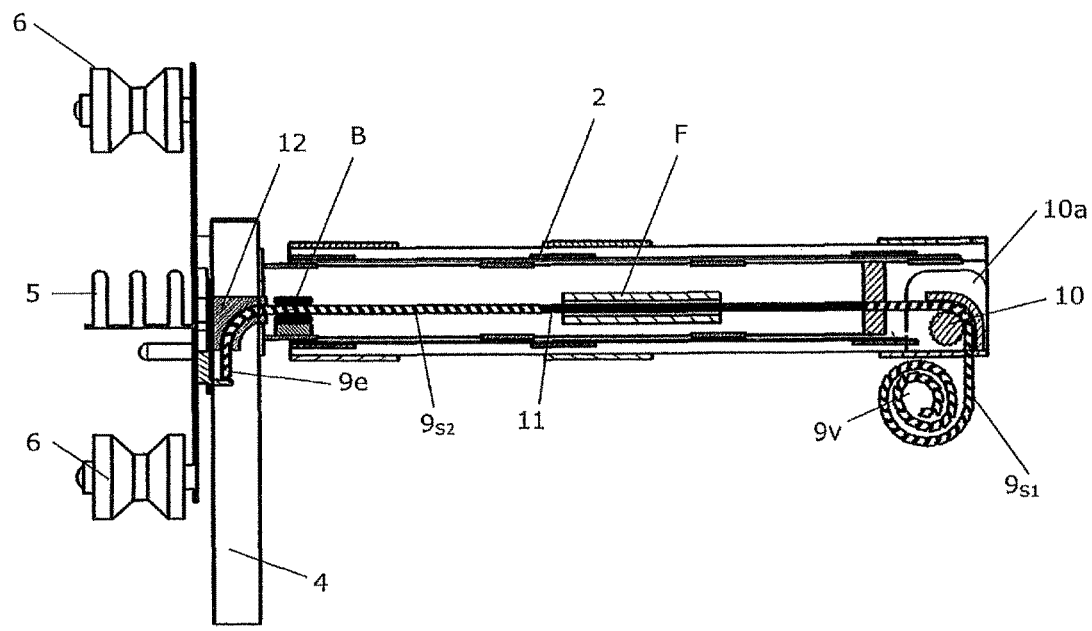
Figure 11A:
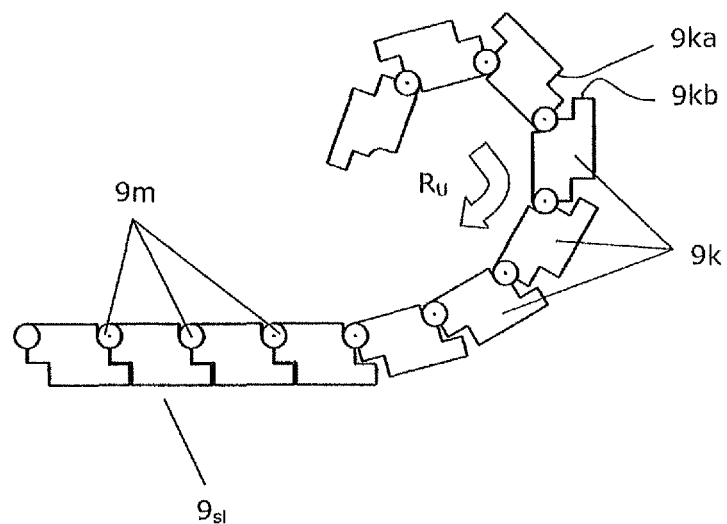
Figure 12:
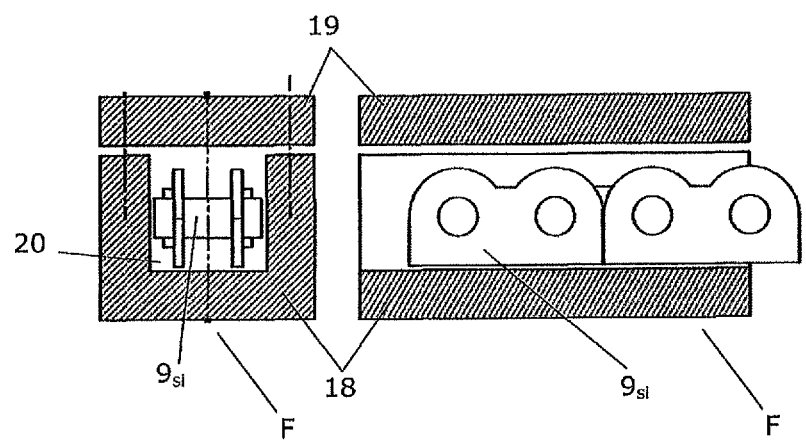
Figure 13:
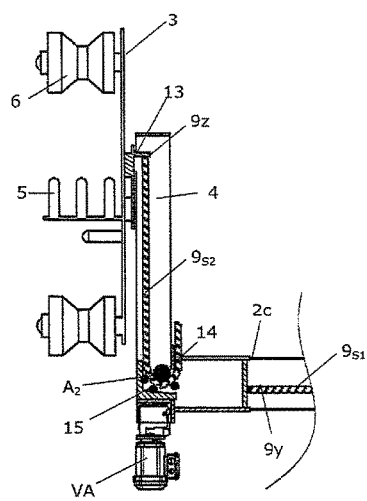
Figure 14:
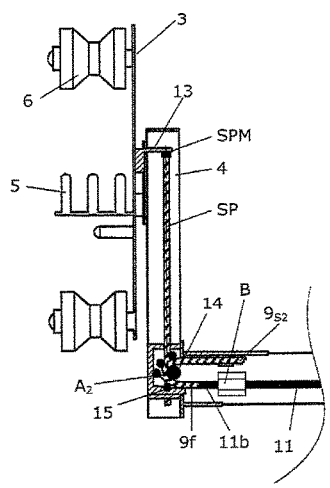
Figure 15:
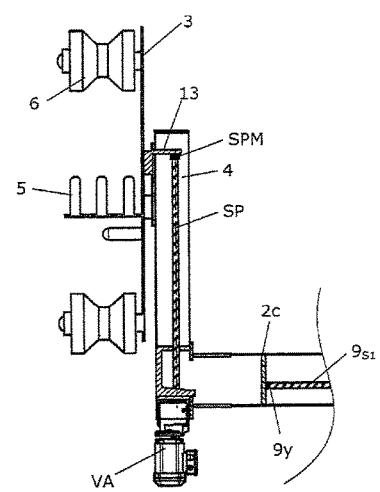

The current collector system according to the invention is set out in greater detail below by means of figures whereby:

FIG. 1: is a lateral view of a retracted current collector system;

FIG. 2: is a longitudinal section through a retracted current collector system according to FIG. 1;

FIG. 3: is a plan view of a retracted current collector system according to FIG. 1;

FIG. 4: is a lateral view of an extended current collector system in which the current collector system has not yet been adjusted upwards in a vertical direction;

FIG. 5: is a plan view of the extended current collector system according to FIG. 4;

FIG. 6a: is a section through the telescopic arm with a vertical guide arranged on it, whereby two alternative arrangements of the rigid chain storage are shown;

FIG. 6b: is a longitudinal section through a further possible embodiment of the current collector system according to the invention in which the rigid chain is deflected twice in the same direction;

FIG. 7a: is a view of a first possible embodiment of the deflection of the rigid chain by means of deflection rollers for the vertical adjustment of the current collector trolley;

FIG. 7b: is a view of a second possible embodiment of the deflection of the rigid chain by means of a deflection guide rollers for the vertical adjustment of the current collector trolley;

FIG. 8a-c: is a view of three movement phases during the vertical adjustment of the current collector trolley by means of a deflection guide according to FIG. 7b FIG. 9a-9d: is a view of the four movement phases: 1. Positioning the vehicle; 2. Extending the telescopic arm until it stops on the deflector plate on the line; 3. Lifting the current collector trolley; 4. Retracting into the power rails and guide tubes of the line of the current collector arrangement;

FIGS. 10a and b: show a current collector system with current collector trolleys which can be lowered;

FIGS. 11a and b: show two rigid chains which can be used;

FIG. 12: is a transverse and longitudinal section through a rigid chain guide;

FIG. 13 shows current collector system with a vertical drive and a second rigid chain arrangement for the vertical adjustment of the current collector trolley, whereby the telescopic arm can be extended and retracted by means of a first rigid chain arrangement;

FIG. 14: shows a current collector system with a spindle drive for the vertical adjustment of the current collector trolley, whereby the spindle drive can be driven by the rigid chain arrangement;

FIG. 15: shows a current collector system with a spindle drive for the vertical adjustment of the current collector trolley, whereby the spindle drive is driven by a vertical drive and the telescopic arm can be extended and retracted by means of a first rigid chain arrangement.

FIG. 1 shows a first possible embodiment of a current collector system 1 according to the invention having a telescopic arm 2. A vertical guide 4 is arranged on the free left end of the telescopic arm 2, on which guide the current collector trolley 3 is mounted in a vertically displaceable manner. The guide 4 has vertically extending guides 4a, for example in the form of pipes, to which the rollers 7 of the current collector trolley 3 are guided and along which they roll. The current collectors 5 are arranged on the current collector trolley 3, which current collectors are brought into contact with the power rails ST of the power rail arrangement S when retracted into the line T, see FIG. 9d. The current collector trolleys 3 also have rollers 6 which are formed as so-called diabolo rollers and which interact with the line guides FS and FR which are shown in FIGS. 9a to 9d and are formed as pipes and guide the current collector trolley 3 after the retraction and introduction into the line and hold it in position relative to the power rails. The rigid chain drive 8 is arranged on the lower right-hand side on the telescopic arm 2. No rigid chain is shown in this representation. The telescopic arm 2 is made up of several telescopic stages and is described in greater detail using the figures.

FIG. 2 shows a longitudinal section through the current collector system 1 shown in FIG. 1 in the region of the rigid chain arrangement 9. The telescopic arm 2 is formed by three telescopic stages 2a, 2b and 2c, whereby the vertical guide 4 for the current collector trolley 3 is arranged on the most extendible telescopic stage 2c. The first telescopic stage 2a is rigidly connected to the vehicle and can therefore not be telescoped, it is however nevertheless designated as a telescopic stage as it serves to guide the second telescopic stage 2b, which in turn guides the third telescopic stage 2c.

The rigid chain arrangement 9 is made up of the two rigid chain segments $9_{s1}$ and $9_{s2}$ and the rigid force transfer element 11 arranged between these. One end 9h of the first rigid chain segment $9_{s1}$ is connected to the first end 11a of the rigid force transfer element 11. The first end 9f of the second rigid chain segment $9_{s2}$ is connected to the second end 11b of the rigid force transfer element 11, the other end 9e of which interacts with a stop 13 which is rigidly connected to the current collector trolley 3. Naturally it is also possible for the rigid chain end 9e to be connected to the part 13.

The rigid chain segment $9_{s1}$ is constructed such that it can only be deflected by means of the deflection gear 10 and the guide 10a in the first direction $R_{U1}$. The rigid chain segment $9_{s1}$ is formed in a manner resistant to buckling in the direction opposite to direction $R_{U1}$.

Figure 11B:
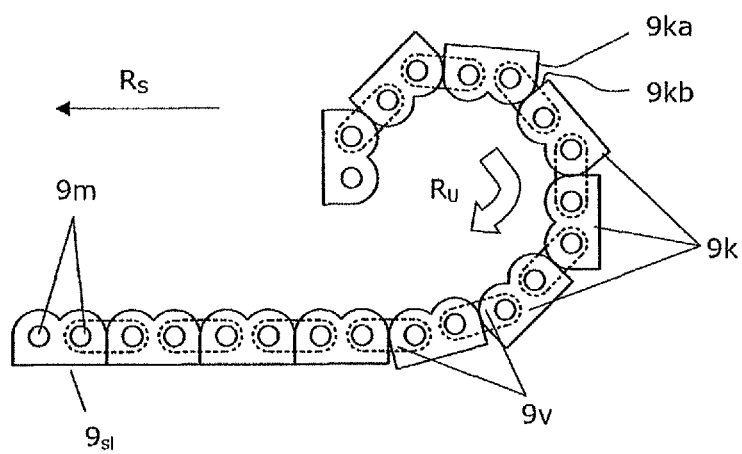

Possible embodiments of rigid chains are shown and described in FIGS. 11a and 11b. The rigid chain arrangement 9 is driven by means of the deflecting gear or deflecting chain wheel 10 for the extension and retraction of the telescopic arm 2 and at least for the lifting of the current collector trolley 3. If the drive 8 is connected without the current being switched off, the rigid chain 9 can move freely about the deflecting chain wheel 10 on the basis of the forces acting on the outside of the current collector system such that the telescopic arm 2 can be freely extended and retracted without great counterforces in order to balance out the changing distance between the vehicle and the line T. The current collector trolley 3 can also be freely operated in a vertical direction along the guide 4 provided the rigid chain drive 8 is connected but the current is not switched on. If the two rigid chain segments $9_{s1}$ and $9_{s2}$ are made up of the same rigid chain links, the two rigid chain segments $9_{s1}$ and $9_{s2}$ are twisted towards one another at an angle of 180° and arranged on the force transfer element 11 in order that the directional deflections $R_{U1}$ and $R_{U2}$ are possible by means of deflecting mechanisms 12, 10 and 10a in opposite directions. It is naturally also possible for the deflection to be achieved by means of the deflection chain wheel 10 for example in a direction which is oriented vertically to the plane of drawing, as shown in FIG. 6. FIG. 6 shows two possible alternative embodiments in which the rigid chain segment $9_{s1}$ (second embodiment) is deflected by means of the deflection chain wheel 10 in direction $R_{U1}$, in other words to the side of the telescopic arm 2 so the chain reserve storage 9v is to the side of the telescopic arm 2. The third alternative embodiment is shown in the bottom right of FIG. 6, whereby the rigid chain segment $9_{s1}$ is deflected by means of the deflection chain wheel 10 in the direction $R_{U1}$, in other words to the side of the telescopic arm 2 so the chain reserve storage 9v is on the other side of the telescopic arm 2 compared to the first embodiment shown in FIG. 6.

As shown in FIG. 2, the rigid chain segments $9_{S1}$ are deflected in the direction $R_{U2}$ by means of the deflecting mechanism 12. The rigid chain links are constructed such that the rigid chain segment $9_{S2}$ can only be deflected by means of the deflecting mechanism 12 which has curved guiding surfaces for the rigid chain links in the direction $R_{U2}$. In the direction opposite to $R_{U2}$ the rigid chain segment $9_{S2}$ is resistant to buckling. FIG. 2 shows the telescopic arm 2 when retracted. The free end region $9v$ and the free rigid chain end $9g$ of the first rigid chain segment $9_{S1}$ which is/are not needed for the transfer of force or are not yet in the region between the deflection gear 10 and the deflection mechanism 12 are rolled up to save space. However, it is also possible for the free end $9g$ to be stockpiled in a meander-shaped manner or in parallel to the telescopic arm 2.

The rigid chain arrangement is guided by means of a guide F which is arranged on the third telescopic stage $2c$. The guide F can be formed by a U-profile 18 as shown in FIG. 12. The space 20 formed by the U-profile 18 can optionally be sealed by means of a cover plate 19. The cover plate 19 prevents the rigid chain $9_{S1}$ buckling in an upwards direction when this is not desired.

The current collector system according to the invention can also have a braking mechanism B by means of which the rigid chain arrangement 9 can be fixed so that if the rigid chain drive 8 fails the telescopic arm 2 remains in the position in which it is at that point.

FIG. 3 is a plane view of the retracted current collector system 1 made up of the telescopic stages $2a$, $2b$ and $2c$, the rigid chain arrangement 9, the vertical guide 4 arranged on the third telescopic stage $2c$ and the current collector trolley 3 with its current collectors 5 and guiding rollers 6.

FIGS. 4 and 5 show a lateral view and a plane view of the extended current collector system 1 in which the second and third telescopic stages $2b$ and $2c$ are completely extended. The rigid chain arrangement 9 is arranged in the centre between the slide rollers $2r_1$, $2r_2$, $2r_3$, $2r_4$ of the telescopic arm 2. In doing this, the slide roller $2r_1$ on the end of the second telescopic stage $2b$ and the slide roller $2r_3$ on the first telescopic stage $2a$ arranged fixed to the vehicle are rotatably mounted and slide or roll in into guides in the third and second telescopic stages $2c$ and $2b$. The slide rollers $2r_2$ and $2r_4$ are each rotatably mounted at the end of telescopic stages $2c$ and $2b$ respectively and run in corresponding guides in telescopic stages $2b$ and $2a$. When extending the telescopic arm 2 the rigid chain arrangement 9 is adjusted by means of the drive 8 in the direction $R_T$ and with the free end $9e$ it pushes the current collector trolley 3 in an upwards direction. Since the force of the weight of the current collector trolley 3 is greater than the friction which occurs in the telescopic arm 2, the current collector trolley 3 remains in the position in which it is shown in FIG. 4 until the current collector trolley 3 of the telescopic arm 2 comes into contact with the stopping plate P shown and explained in FIGS. 9a to 9c. The stopping plate P prevents a further extension of the telescopic arm 2, as a result of which the rigid chain 9 still being driven in the direction $R_T$ pushes the current collector trolley 3 in an upwards direction.

As already explained, FIG. 6 shows two alternative, second and third embodiments in which the first rigid chain segment $9_{S1'}$ and $9_{S1''}$ is deflected about the first axis $A_1$, whereby the axis $A_1$ is in parallel to the vertical direction of adjustment $R_v$. In this arrangement, the rigid chain reserve storage $9v$ is on the side adjacent to the telescopic arm 2. Due to the fact that the first axis $A_1$ is arranged perpendicular to the second axis $A_2$, the rigid chain arrangement must have two rigid chain segments $9_{s1}$ and $9_{s2}$ which are arranged twisted towards one another at an angle of 90°, whereby the two rigid chain segments $9_{s1}$ and $9_{s2}$ are connected to one another by means of the rigid connection element 11.

FIG. 6b shows a fourth possible embodiment in which the rigid chain reserve storage $9v$ is arranged above the telescopic arm. The advantage of this is the fact that the two deflection directions $R_{u1}$ and $R_{u2}$ point in the same direction such that a continuous rigid chain can be used since the two axes $A_1$ and $A_2$ are also arranged in parallel to one another.

FIG. 7a shows a fifth possible embodiment in which the deflection of the second rigid chain segment $9_{S2}$ in the direction $R_{U2}$ about the second axis $A_2$ is achieved by means of a deflection roller 14, which can also be formed as a chain wheel and two further deflection rollers 15. The deflection rollers 15 can also be replaced by appropriate guiding surfaces. The axes of the deflection rollers 14, 15 are arranged perpendicular to the plane of drawing. It is possible that in a further formation of the fifth embodiment the deflection chain wheel 14 is driven by means of a deflection drive so that the second rigid chain segment $9_{S2}$ can be driven or fixed relative to the third telescopic stage $2c$. Blocking the deflection drive can actively prevent a vertical movement of the current collector trolley 3. This therefore means, for example, that no deflector plate P is needed and the current collector trolleys 3 are positioned in the correct position both horizontally and vertically for insertion into the power rail arrangement by means of the rigid chain drive 8 and the deflection drive provided the relevant sensors and controls are present. In the case of a relevant control the current collector trolley 3 can also be lifted during the extension of the telescopic arm 2 so the threading in process can be accelerated.

FIG. 7b is an enlarged representation of the deflecting mechanism 12 shown in FIG. 2 which has curved guides for the rigid chain 9.

In all of the embodiments described above it is true that the length of the second rigid chain segment $9_{s2}$ is, as far as possible, designed such that the end $11b$ of the rigid force transfer element 11 still does not reach the deflection region of the deflection rollers 14, 15 when the current collector trolley 3 has already been moved upwards as far as possible. The length of the force transfer element 11 can in turn be dimensioned such that when the telescopic arm 2 is fully, extended and the current collector trolley 3 has been fully brought down it still does not reach the deflection region of the rigid chain drive 8. With a dimensioning of the force transfer element 11 of this kind the rigid chain segments $9_{s1}$ and $9_{s2}$ can be particularly short, as a result of which the rigid chain arrangement can transfer high levels of thrust and can simultaneously be manufactured in a cost-effective manner.

FIGS. 8a to 8c show the lifting up of the current collector trolley 3 once the telescopic arm 2 has been extended so far that the current collector trolley 3 is precisely underneath the power rails or impacts the deflection plate P of the power rail arrangement S (not shown). FIG. 8a shows the current collector trolley 3 in the lowest position. Since the telescopic arm 2 cannot extend any further due to the deflection plate P and the counterforce $P_K$, when the rigid chain arrangement 9 is driven further in the direction $R_T$ the second rigid chain segment $9_{S2}$ is deflected about the deflecting mechanism 12 and uses its end $9e$ to push the current collector trolley 3 upwards. This occurs until the current collector system recognises that the current collector trolley 3 has reached its highest position (FIG. 8c) or is lying on or pushing against the upper guiding pipes FS of the current collector arrangement with its upper guiding rollers 6. Using the guide F arranged on the third telescopic stage 2c, the drive chain arrangement 9 is guided within the telescopic arm 2. The braking mechanism B, by means of which the rigid chain arrangement 9 can be fixed so that in the case of a failure of the rigid chain drive 8 the telescopic arm 2 and the current collector trolley 3 are held in position, can also be used as a chain guide.

Figure 9A:
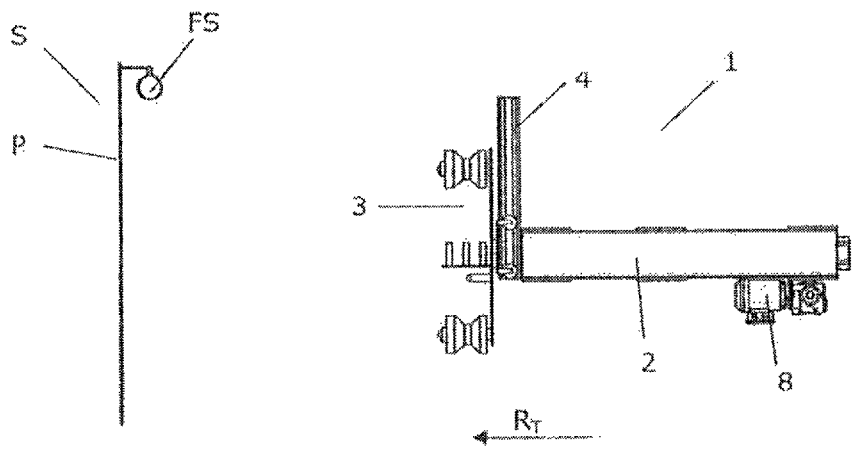
Figure 9B:
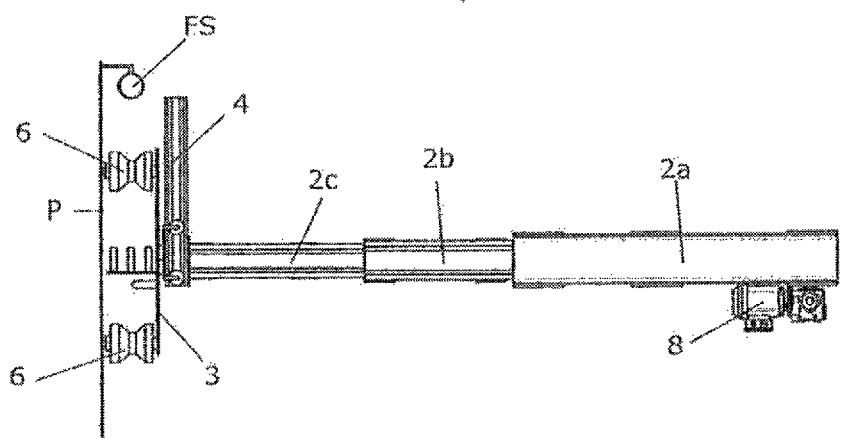
Figure 9C:
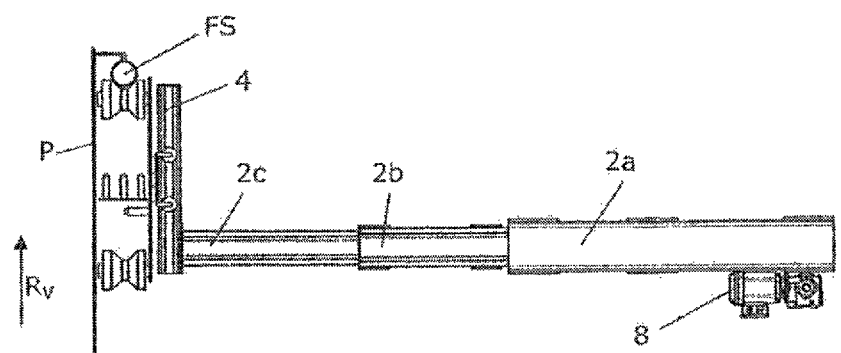
Figure 9D:
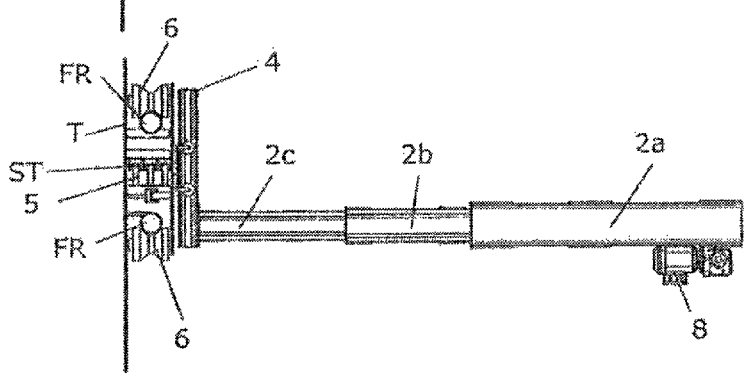

FIGS. 9a to 9d show the process of inserting the current collector trolley 3 into the line T. FIG. 9a shows the start of the insertion process after the vehicle has been positioned relative to the deflection plate such that the current collector trolley 3 can be adjusted by means of the extension of the telescopic arm 2 in a horizontal direction against the deflection plate P. FIG. 9b shows the point at which the current collector trolley 3 impacts the deflection plate P and the current collector trolley 3 is still in its lowest position. After this, as already show and described in FIGS. 8b and 8c, the current collector trolley 3 is adjusted in a vertical direction by means of the further adjustment of the rigid chain arrangement 9 until the upper guiding rollers 6 push against the inlet pipe FS. The vehicle (not shown) is then moved in the direction of travel which is oriented in a manner perpendicular to the drawing plane, as a result of which the rollers 6 of the current collector trolley 3 travel on the travel line pipe and encompass this from the top and the bottom such that the current collector trolley 3 is guided safely and held by the travel line pipe. At the same time, the current collectors 5, guided by insertion funnels (not shown) engage in the power rails ST as shown in FIG. 9d.

Figure 10B:
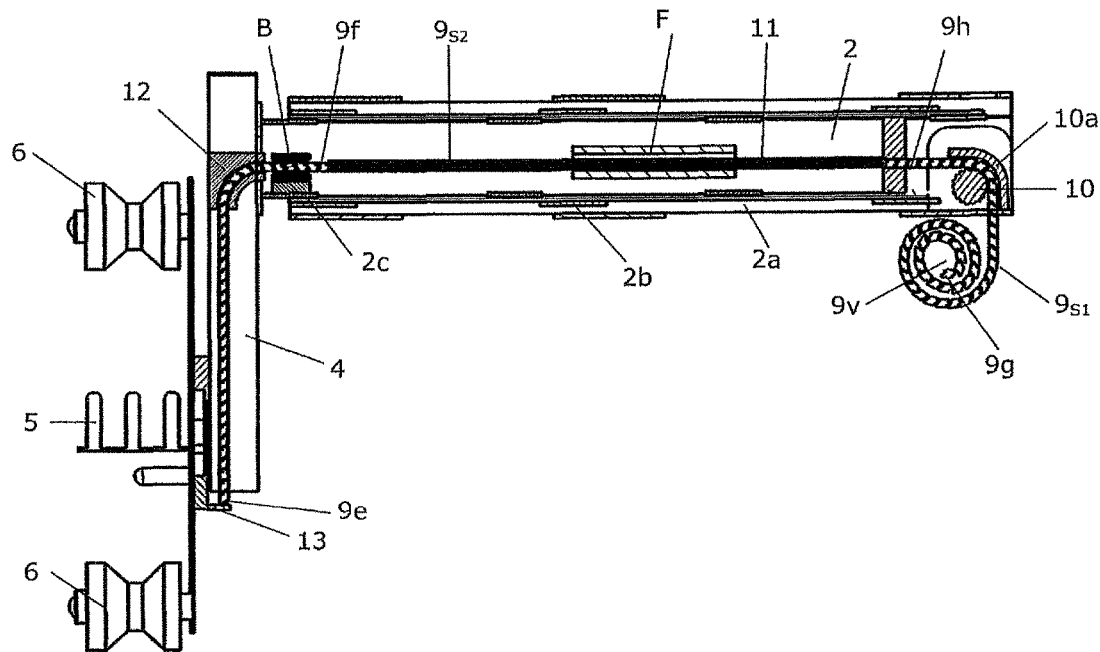

FIGS. 10a and 10b show a further possible embodiment in which the current collector trolley 3 remains in the upper position (FIG. 10a) when the telescopic arm 2 is retracted. This embodiment is needed if the current collector trolley has to be lowered to be inserted into the line on an insertion pipe FS arranged at the bottom (not shown). If, as shown in FIG. 10b, the braking mechanism B arranged on the third telescopic stage 2c is released and the rigid chain arrangement 9 adjusted by means of the rigid chain drive 8 in the horizontal direction of telescoping $R_T$, the current collector trolley 3 would initially be lowered due to its own weight without the telescopic arm 2 extending. However, since the telescopic arm 2 initially has to be extended or telescoped, the braking or locking mechanism B must be switched on first so the current collector trolley 3 cannot be lowered. The rigid chain arrangement 9 pushes the third telescopic stage 2c from the second telescopic stage 2b when the braking mechanism B is switched on and this in turn from the first telescopic stage 2a until the current collector trolley 3 impacts the deflection plate P (not shown) of the line T. The impact must be detected by means of suitable sensors or using the motor current, whereby a control device accordingly controls and releases the braking mechanism B such that during the further adjustment of the rigid chain arrangement 9 the current collector trolley 3 can be lowered onto the insertion pipe FS of the line arranged below. However, it is also possible for the braking mechanism to be triggered mechanically on impact. Once the lower insertion position has been reached, the vehicle can be moved in the direction of travel in the known manner so that the current collector trolley retracts into the power rail arrangement.

FIGS. 11a and 11b show two possible embodiments of the rigid chain $9_{S1}$ used. The rigid chain $9_{S1}$ is made up of rigid chain links 9k which are articulately joined to one another. Both of the rigid chains shown $9_{S1}$ can only be deflected about the deflection direction $R_U$. In the direction opposite to the deflection direction $R_U$ the rigid chains $9_{S1}$ are resistant to, buckling. The resistance to buckling is achieved by means of the contact surfaces 9ka and 9kb arranged transverse to the direction of thrust $R_S$. It is naturally also possible to use other types of rigid chain for the current collector system according to the invention. It is also possible to use rigid chains split into two which are made of half rigid chains which are first separated from one another. Only when the two half rigid chains are brought together does this type of rigid chain become resistance to buckling and able to transfer thrust.

FIG. 13 shows a further possible embodiment of the current collector system according to the invention with a vertical drive VA which drives a chain wheel 14 in order for a second rigid chain arrangement $9_{S2}$ to be deflected by means of guiding rollers 15. The upper end 9z of the rigid chain arrangement $9_{S2}$ interacts with a part 13 of the current collector trolley 3. By driving the chain wheel 14 the rigid chain arrangement $9_{S2}$ is adjusted and therefore the current collector trolley 3 is moved upwards or downwards in a vertical direction. The telescopic arm 2 is extended and retracted by means of a first rigid chain arrangement $9_{S1}$ which is driven by means of the rigid chain drive 8 shown in FIG. 2. The vertical movement of the current collector trolley 3 can therefore be controlled independently of the telescopic arm 2.

FIG. 14 shows a further possible embodiment of the current collector system according to the invention in which the current collector trolley 3 can be lifted or lowered in a vertical direction by means of a spindle drive SP. The spindle SP drives a spindle nut which is connected to the current collector trolley 3 and the part 13 in a non-rotatable manner. In this embodiment, the spindle is driven by means of the chain wheel 14 which in turn can be driven by the rigid chain arrangement 9 and the second chain segment of this $9_{S2}$. The second chain segment $9_{S2}$ is guided back into the chain arm 2 or the third telescopic stage 2c by means of the chain wheel 14. The rigid chain $9_{s2}$ can be locked or fixed relative to the third telescopic stage 2c by means of a braking mechanism B. When the rigid chain $9_{S2}$ is locked, the chain wheel 14 does not twist, as a result of which the current collector trolley 3 is held in position vertically. If the braking mechanism B is released, the telescopic arm 2 or the current collector trolley 3 is being pushed against the deflection plate P and the rigid chain drive 8 is extending the rigid chain arrangement further in the direction of the telescoping, the second rigid chain segment $9_{S2}$ drives the chain wheel 14, resulting in the spindle SP being driven and the current collector trolley 3 being adjusted in an upwards direction.

FIG. 15 shows a further possible embodiment of the current collector system according to the invention which has a spindle drive SP, SPM for the vertical adjustment of the current collector trolley 3. The spindle drive SP, SPM is driven by a vertical drive VA which is controlled separately from the rigid chain drive 8. The telescopic arm 2 can be extended and retracted by means of the first rigid chain arrangement $9_{S1}$, which is driven by the rigid chain drive 8.

What is claimed is:

1. A current collector system for a vehicle which can be moved in a longitudinal direction along a power rail arrangement, the current collector system including:
   at least one current collector trolley;
   one or more current collector contacts arranged on the at least one current collector trolley and configured to be connected to power rails of the power rail arrangement;
   a telescopic arm configured to be fixed to the vehicle; and
   an adjustment drive comprising at least one rigid chain arrangement and at least a first rigid chain drive, wherein the adjustment drive is configured to extend and/or retract the telescopic arm, and wherein the telescopic arm comprises at least one telescopable telescopic stage, wherein an end of the rigid chain arrangement is connected to a most extendible telescopic stage of the at least one telescopable telescopic stage or to the current collector trolley in a fixed manner or is configured to be connected by means of a locking mechanism.

2. The current collector system according to claim 1, wherein the telescopic arm comprises at least one telescopable telescopic stage, wherein the rigid chain arrangement is guided, supported and/or mounted on the at least one telescopic stage in a direction of thrust and is configured to be guided in a region of the at least one telescopic stage by a guide and/or support rails.

3. The current collector system according to claim 1, wherein the telescopic arm comprises at least one telescopable telescopic stage, and wherein an end of the rigid chain arrangement interacts with a most extendible telescopic stage of the at least one telescopable telescopic stage or with a stop or connecting element arranged on the current collector trolley.

4. The current collector system according to claim 1, wherein the first rigid chain drive deflects the rigid chain arrangement or a first rigid chain segment of the rigid chain arrangement about a first axis.

5. The current collector system according to claim 1, wherein a vertical drive or the rigid chain arrangement is configured to adjust the current collector trolley in a vertical direction.

6. The current collector system according to claim 5, wherein the telescopic arm comprises at least one telescopable telescopic stage, and wherein the current collector trolley is displaceably mounted on a most extendible one of the at least one telescopable telescopic stage in the vertical direction.

7. The current collector system according to claim 5, wherein the telescopic arm comprises at least one telescopable telescopic stage, and further including a deflecting mechanism arranged on most extendible one of the at least one telescopable telescopic stage, which deflecting mechanism is configured to deflect the rigid chain arrangement or a second rigid chain segment of the rigid chain arrangement about a second axis.

8. The current collector system according to, claim 7, wherein the rigid chain arrangement runs in parallel to the at least one telescopable telescopic stage as far as the deflecting mechanism, in a telescoping direction, and wherein the deflecting mechanism is configured to deflect the rigid chain arrangement in a direction running transverse or perpendicular to the direction of telescoping.

9. The current collector system according to claim 7, wherein the deflecting mechanism , comprises a gear wheel or chain wheel and is configured to be driven or fixed by means of a deflection drive.

10. The current collector system according to claim 9, wherein the deflection drive or the further rigid chain drive is controlled by a control unit of the current collector system in such a manner that, in order to extend the telescopic arm, the deflection drive or the further rigid chain drive is configured to generate a drive or holding torque on the rigid chain arrangement or the second rigid chain segment such that the rigid chain arrangement does not move relative to the deflecting mechanism and the most extendible telescopic stage of the at least one telescopable telescopic stage, and wherein, for the vertical adjustment of the current collector trolley, the deflecting drive or the further rigid chain drive is synchronised with the first rigid chain drive such that a length of the extended telescopic arm does not change and, as a result of this, the current collector trolley is lifted or lowered.

11. The current collector system according to claim 7, wherein the deflecting mechanism comprises one or more curved guiding surfaces configured to guide the rigid chain arrangement in a curved path, whereby the rigid chain links are aligned straight relative to one another when they leave the deflecting mechanism and are enabled to transfer thrust to one another.

12. The current collector system according to claim 11, further including a braking mechanism and/or a further rigid chain drive arranged on the most extendible telescopic stage of the at least one telescopable telescopic stage or on the deflecting mechanism , wherein the braking mechanism is configured to adjust and/or fix the rigid chain relative to the most extendible telescopic stage of the at least one telescopable telescopic stage.

13. The current collector system according to, claim 1, wherein a free end of the rigid chain arrangement is connected to the current collector trolley directly or via a gear.

14. The current collector system according to claim 1, wherein the rigid chain arrangement comprises first and second rigid chain segments, and wherein the second rigid chain segment is configured to drive a vertical drive.

15. The current collector system according to claim 1, wherein the telescopic arm, in an extended or retracted position or both, is configured to be braced by at least one holding mechanism in such a way that telescopic stages of the telescopic arm are enabled to be fixed relative to one another at various extension lengths.

16. The current collector system according to claim 1, wherein the telescopic arm comprises at least one telescopable telescopic stage, and further comprising at least one damping arrangement and/or a spring arranged between a most extendible telescopic stage of the at least one telescopable telescopic stage and an adjacent telescopic stage, wherein the at least one damping arrangement and/or spring is configured to decrease the acceleration of the most extensible telescopic stage relative to the rigid chain arrangement.

17. The current collector system according to claim 1, wherein the telescopic arm comprises at least one telescopable telescopic stage, the system further including a braking mechanism or locking mechanism arranged on most extendible telescopic stage of the at least one telescopable telescopic stage or on a first telescopic stage of the at least one telescopable telescopic stage and configured to exert a braking force on the rigid chain arrangement or on a rigid chain segment of the rigid chain arrangement and/or on the deflecting mechanism and/or the rigid chain arrangement, or is configured to lock a rigid chain segment relative to the telescopic stage on which the braking or locking mechanism is arranged.

18. The current collector system according to claim 1, wherein the rigid chain arrangement has at least two rigid chain segments that are each made up of several chain links.

19. The current collector system according to, claim 1, further including a rigid force transfer element arranged between two chain segments of the rigid chain arrangement.

20. The current collector system according to claim 18, wherein the rigid chain segments are arranged twisted towards one another at an angle in a direction of telescoping such that the first rigid chain segment is deflected in a first direction about a first axis and the second rigid chain segment is deflected in a second direction about a second axis, whereby the first and second axes are parallel or perpendicular to one another.

21. The current collector system according to claim 1, further including a control unit configured to control a rigid chain drive and/or a deflecting drive, whereby the current collector system is enabled to determine horizontal end or stop positions of the telescopic arm and telescopic stages of the telescopic arm by means of a sensor and/or by using a motor current flowing through the first rigid chain drive and/or to determine vertical and or stop positions of the current collector trolley by means of a sensor and/or by means of a current flowing through a deflecting drive or a vertical drive.

22. The current collector system according to claim 1, wherein the current collector system further includes a base body fixed to the vehicle, whereby a first rigid chain drive of the rigid chain arrangement is fixed to the base body, and wherein the base body is configured to take in a part or rigid chain reserve of the rigid chain arrangement not being used to generate thrust or traction.

23. A crane or conveyor system, comprising:
a crane or a conveyor configured to be moved along a power rail arrangement in a longitudinal direction; and
at least one current collector system according to claim 1, wherein the at least one current collector system is disposed on the crane or conveyor.

24. A method of bringing the current collector contacts of the current collector system according to claim 1 into contact with power rails of the power rail arrangement, the method including:
positioning the movable vehicle adjacent to the power rail arrangement,
extending the telescopic arm in a horizontal direction using the first rigid chain drive until the current collector trolley is aligned relative to the power rail arrangement in the horizontal direction and has reached its horizontal contact position, and
vertically adjusting the current collector trolley using a vertical drive or the first and/or further rigid chain drive until the current collectors are in the region of insertion funnels.

25. The method according to claim 24, wherein said extending the telescopic arm comprises using the rigid chain drive to extend the telescopic arm horizontally until the current collector trolley or a most extendible telescopic stage of the telescopic arm impacts a deflection plate arranged on the power rail arrangement.

26. The method according to claim 25, further including adjusting a vertical height of the current collector trolley relative to the telescopic arm, and wherein, after successful insertion of the current collector trolley into the power rail arrangement, the rigid chain drive is switched currentless.

* * * * *